(12) United States Patent
Edwards et al.

(10) Patent No.: US 11,798,418 B2
(45) Date of Patent: Oct. 24, 2023

(54) SYSTEMS AND METHODS FOR EXTRACTING INFORMATION FROM A TRANSACTION DESCRIPTION

(71) Applicant: Capital One Services, LLC, McLean, VA (US)

(72) Inventors: Joshua Edwards, Philadelphia, PA (US); Abdelkader Benkreira, Washington, DC (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/709,253

(22) Filed: Mar. 30, 2022

(65) Prior Publication Data

US 2022/0223045 A1  Jul. 14, 2022

Related U.S. Application Data

(63) Continuation of application No. 16/419,382, filed on May 22, 2019, now Pat. No. 11,380,202, which is a
(Continued)

(51) Int. Cl.
*G08G 1/16* (2006.01)
*G06F 16/29* (2019.01)
(Continued)

(52) U.S. Cl.
CPC .............. *G08G 1/161* (2013.01); *G01S 19/42* (2013.01); *G06F 16/29* (2019.01); *G06F 16/909* (2019.01); *G06Q 20/10* (2013.01); *G08G 1/166* (2013.01)

(58) Field of Classification Search
CPC ....... H04W 4/02; H04W 4/029; H04W 88/00; G06Q 20/32; G06Q 20/10; G06Q 40/08; G06F 16/9097; G06F 16/29; G01C 21/00; G01C 21/12; G01C 21/2634; G01C 21/34; G01C 21/3453; G01C 21/3476; G01S 19/00; G01S 19/03; G01S 19/25; G01S 19/31; G01S 19/38; G01S 19/39; G01S 19/42; G01S 19/421; G05D 2201/02; B60W 30/00; B60W 30/10; B60W 30/12; G01D 1/0289; G09B 9/16; G09B 9/167; G08G 1/00; G08G 1/0968; G08G 1/096822;
(Continued)

(56) References Cited

U.S. PATENT DOCUMENTS

| | | | |
|---|---|---|---|
| 7,579,965 B2 * | 8/2009 | Bucholz | G08G 1/017 340/933 |
| 11,017,665 B1 * | 5/2021 | Roy | G08G 1/087 |
| 2019/0265059 A1 * | 8/2019 | Warnick | G08G 1/20 |

* cited by examiner

*Primary Examiner* — Anthony R Jimenez
(74) *Attorney, Agent, or Firm* — Perkins Coie LLP

(57) ABSTRACT

Methods and systems for vehicle-to-vehicle communication are disclosed. In some embodiments, the method includes: receiving, from a first vehicle via a network, a request for communicating with another vehicle; receiving, via the network, a first position signal from the first vehicle; determining a position of the first vehicle based on the first position signal; determining a target vehicle of the request, based on the request and the position of the first vehicle; transmitting, via the network, the request to the target vehicle; determining whether the target vehicle drives according to the request; and adding an amount of credit to an account associated with the target vehicle when it is determined that the target vehicle drives according to the request.

18 Claims, 5 Drawing Sheets

Related U.S. Application Data continuation of application No. 16/202,060, filed on Nov. 27, 2018, now Pat. No. 10,347,128.

(51) Int. Cl.
*G01S 19/42* (2010.01)
*G06Q 20/10* (2012.01)
*G06F 16/909* (2019.01)

(58) Field of Classification Search
CPC .......... G08G 1/123; G08G 1/127; G08G 1/16; G08G 1/164; G08G 1/20; G08G 1/205; G08G 1/207; G08G 1/0967; G08G 1/096791; G08G 1/161; G08G 1/166
USPC ............ 705/4; 340/439; 701/119, 300, 29.3, 701/31.5, 117, 210, 400, 408, 411, 412, 701/416, 423, 468, 482, 485
See application file for complete search history.

SYSTEMS AND METHODS FOR EXTRACTING INFORMATION FROM A TRANSACTION DESCRIPTION

CROSS-REFERENCE TO RELATED APPLICATIONS

This application is a continuation of U.S. patent application Ser. No. 16/419,382, filed May 22, 2019, which is a continuation of U.S. patent application Ser. No. 16/202,060, filed Nov. 27, 2018, which applications are incorporated herein in their entirety by reference.

TECHNICAL FIELD

The present disclosure generally relates to vehicular communication systems, and more particularly, to an inter-vehicle communication system for coordinating driving behaviors and regulating traffic.

BACKGROUND

Driving is a social task where drivers frequently need to communicate with other drivers to make their intentions clear and avoid accidents. For example, a driver hoping to overtake a very slow vehicle in front may want to ask that vehicle to change to another lane. As another example, a driver who must change multiple lanes to make a left turn may want to request other adjacent cars to make room for the lane changes.

However, current driver interaction or vehicle communication, which is mostly nonverbal in nature, has specific characteristics that can make it difficult to determine the precise intent of each driver involved. First, the vehicle creates a spatial separation and a physical barrier between drivers. Use of existing vehicle signals, such as turning on left or right turn signal lights, switching headlights on/off, or sounding the horn, may be insufficient to convey the exact intention of a driver to other drivers. Also, it may be necessary to complete the interaction between drivers in a short period of time because of the high speed of the vehicles. Finally, visual information such as facial expressions or gestures may not be easily visible to other drivers, especially when driving at night. Such visual information, therefore, may also be unsuitable for driver-to-driver communication.

Furthermore, in the "overtaking" and "lane-changing" examples discussed above, even if other drivers can accurately understand the requesting driver's intention, they are not required by law to cooperate with the requesting driver. Often, other drivers may simply ignore the request or may refuse to follow it, or may themselves be in a hurry and may thus hesitate to give the right-of-way to another driver.

In view of these and other shortcomings and problems, a need exists to provide improved systems and methods for allowing drivers to communicate with each other to coordinate driving behaviors and regulate traffic.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments include vehicle-to-vehicle communication systems and methods.

In one embodiment, a computer-implemented method for vehicle-to-vehicle communication is disclosed. The method includes receiving, from a first vehicle via a network, a request for communicating with another vehicle. The method also includes receiving, via the network, a first position signal from the first vehicle. The method further includes determining a position of the first vehicle based on the first position signal. The method includes determining a target vehicle of the request, based on the request and the position of the first vehicle. The method also includes transmitting, via the network, the request to the target vehicle. The method also includes determining whether the target vehicle drives according to the request. The method further includes adding an amount of credit to an account associated with the target vehicle when it is determined that the target vehicle drives according to the request.

In another embodiment, a computer-implemented method for generating electronic signatures is disclosed. The method includes receiving, over a network, position signals of a plurality of vehicles. The method also includes receiving, from a first vehicle in the plurality of vehicles, a request for communicating with another vehicle. The method further includes determining relative positions of the plurality of vehicles, based on the position signals. The method includes determining a second vehicle from the plurality of vehicles, based on the request and the determined relative positions of the plurality of the vehicles. The method also includes transmitting, via the network, the request to the second vehicle. The method includes tracking movements of the first and second vehicles. The method also includes determining whether the request is fulfilled by the second vehicle, based on the tracked movements of the first and second vehicles. In addition, the method includes adding an amount of credit to an account associated with the second vehicle when it is determined that the request is fulfilled by the second vehicle.

In another embodiment, a non-transitory computer-readable medium is disclosed. The non-transitory computer-readable medium stores instructions which, when executed, cause one or more processors to perform a method for vehicle-to-vehicle communication. The method includes receiving, from a first vehicle via a network, a request for communicating with another vehicle. The method also includes receiving, via the network, a first position signal from the first vehicle. The method further includes determining a position of the first vehicle based on the first position signal. The method includes determining a target vehicle of the request, based on the request and the position of the first vehicle. The method also includes transmitting, via the network, the request to the target vehicle. The method also includes determining whether the target vehicle drives according to the request. The method further includes adding an amount of credit to an account associated with the target vehicle when it is determined that the target vehicle drives according to the request.

Aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

DETAILED DESCRIPTION

As described above, vehicles or drivers constantly need to communicate with each other to coordinate their usage of the road. For example, a driver driving on a one-lane road may want to pass another vehicle driving in the front. As another example, a driver travelling on a busy highway may have to switch multiple lanes within a short driving distance to be able to reach an exit. As yet another example, a driver stopping at a red light may find that the driver must change to a left lane to make a left turn. In such situations, a driver who wants to use the road in certain way must convey its intention to surrounding vehicles/drivers. Moreover the driver requires cooperation of the surrounding vehicles/drivers to achieve its goal. Existing vehicle systems, however, do not provide an efficient way for different vehicles or drivers to communicate their respective intentions to other drivers. Nor do they allow the drivers to negotiate about usage of the road. Moreover, unlike emergency vehicles such as police cars, ambulances, or fire trucks, an ordinary vehicle cannot force other vehicles to yield unless required by law or traffic signs.

The present disclosure provides a vehicle-to-vehicle communication system to facilitate communication between different drivers about their respective intentions regarding using a road. In particular, the disclosed system enables drivers to use electronic messages to clearly and conveniently communicate their intentions. Moreover, the disclosed system allows a driver to provide monetary or nonmonetary compensation to one or more of the other drivers, in exchange for adoption of certain driving behaviors by the other drivers. In this manner, the driver can more effectively influence the driving behaviors of other drivers to achieve its goal of using the road. Thus, the disclosed system enables drivers to perform self-regulation of traffic and improves driving safety and efficiency.

Figure 1:
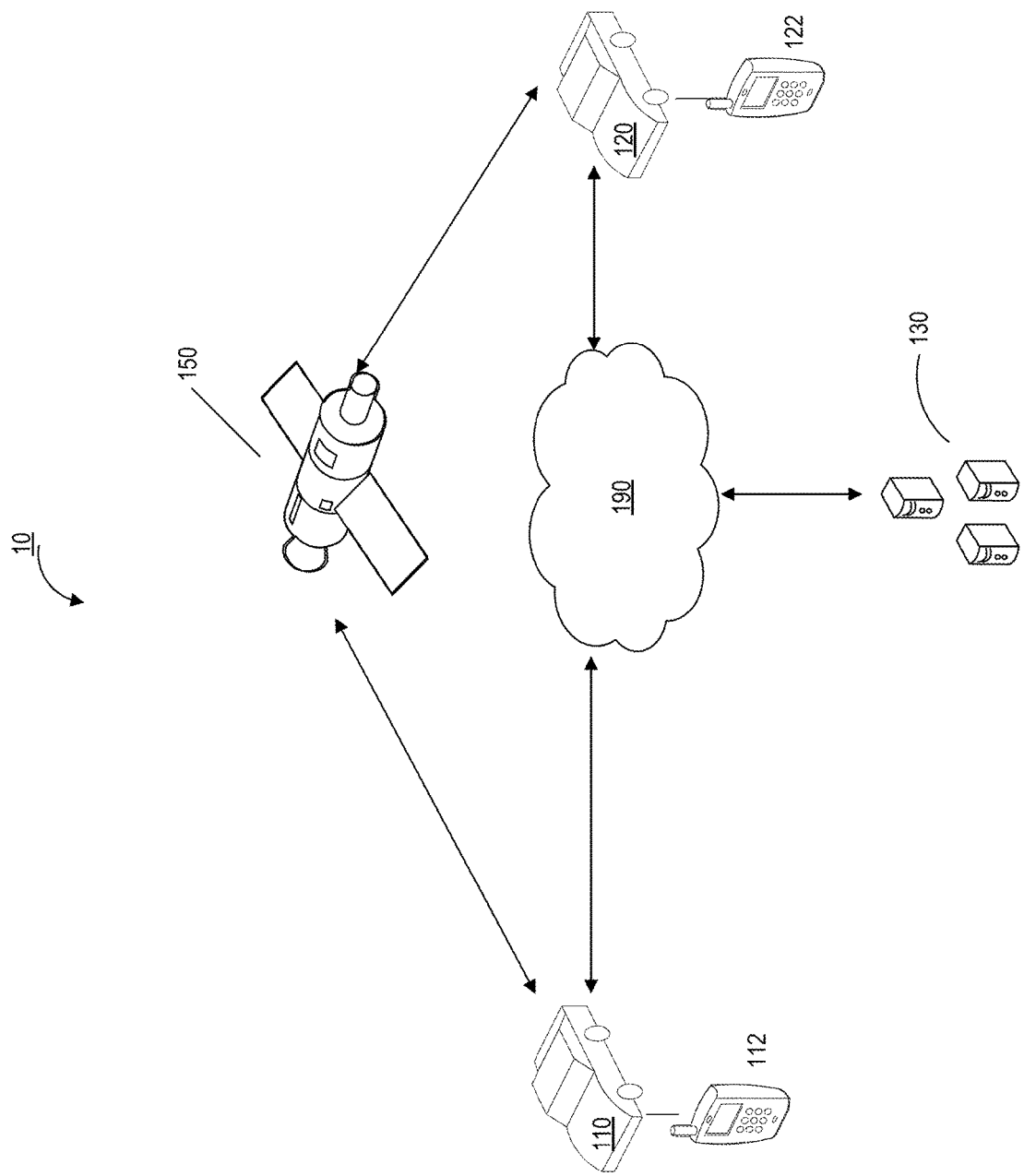
FIG. 1 is a schematic diagram illustrating an exemplary system 10 for vehicle-to-vehicle communication, consistent with disclosed embodiments.

FIG. 1 is a schematic diagram illustrating an exemplary system 10 for vehicle-to-vehicle communication, consistent with disclosed embodiments. Referring to FIG. 1, system 10 may include a plurality of vehicles including, for example, a first vehicle 110 and a second vehicle 120. Each of vehicles 110, 120 may be an electric vehicle, a fuel cell vehicle, a hybrid vehicle, a conventional internal combustion engine vehicle, or any other type of a vehicle. The vehicle may have any body style, such as a sports car, a coupe, a sedan, a pick-up truck, a station wagon, a sports utility vehicle (SUV), a minivan, or a conversion van. The vehicle may be configured to be operated by an operator occupying the vehicle, be remotely controlled, and/or be autonomous.

System 10 may also include user devices 112, 122 that may be associated with vehicles 110, 120, respectively. In the disclosed embodiments, each of users devices 112, 122 may be a computing device embedded in or integrated with a respective vehicle. Alternatively, each of users devices 112, 122 may be a mobile device located in the respective vehicle while the respective vehicle is being driven. For example, the mobile device may be a smart phone, a tablet computer, a wearable device, or the like associated with a driver of the respective vehicle.

Each of users devices 112, 122 may include a Global Positioning System (GPS) receiver configured to receive GPS signals from a satellite system 150. In some embodiments, users devices 112, 122 may be further configured to determine their positions (and thus the positions of vehicles 110, 120 in which users devices 112, 122 may be located) based on the received satellite signals. Additionally or alternatively, users devices 112, 122 may convey the received satellite signals to server 130 for determination of the positions of vehicles 110, 120. As known in the related art, a GPS is a system of satellites that provides autonomous geo-spatial positioning with global coverage.

Consistent with the disclosed embodiments, vehicles 110, 120 may share the use of the same road and the drivers therein may use user devices 112, 122 to communicate with each other, to coordinate their driving behavior. For example, vehicle 110 may be driving behind vehicle 120 in the same lane of a road. The driver of vehicle 110 may be in a hurry (e.g., reaching a job interview or transferring a spouse in labor to hospital). In this situation, the driver of vehicle 110 may wish to go around the slower travelling vehicle 120, to drive faster (up to the legal speed limit) than that possible with vehicle 120 positioned in front of vehicle 110. In this situation, the driver of vehicle 110 may use user device 112 to communicate with the driver of vehicle 120, requesting vehicle 120 to change to another lane or make a stop at the roadside, so that vehicle 110 can pass vehicle 120.

Although FIG. 1 only shows one vehicle 110 and one vehicle 120, the present disclosure does not limit the number of vehicles among which system 10 can facilitate the communication. As described in more detail below, for example, vehicle 110 may send messages to multiple vehicles (e.g., vehicles 120-1, 120-2, 120-3, . . . , 120-N) on its left, requesting these vehicles to let it enter the left lane. As another example, if vehicle 120 drives slowly and holds the traffic on a one-lane road, multiple vehicles (e.g., vehicles 110-1, 110-2, 110-3, . . . , 110-N) behind vehicle 120 may request vehicle 120 to allow them to pass it.

Consistent with the disclosed embodiments, user device 112 may transmit the request to user device 122 directly, or via server 130. User devices 112, 122 and server 130 may communicate with each other via network 190. Network 190 may be any type of wireless network that may allow transmitting and receiving data. For example, network 190 may be a wired network, a cellular network, an Internet, a wide area network, a local wireless network (e.g., Bluetooth™, WiFi, near field communications (NFC), etc.), or the like, or a combination thereof. Other known communication methods which provide a medium for transmitting data are also contemplated.

Figure 2:
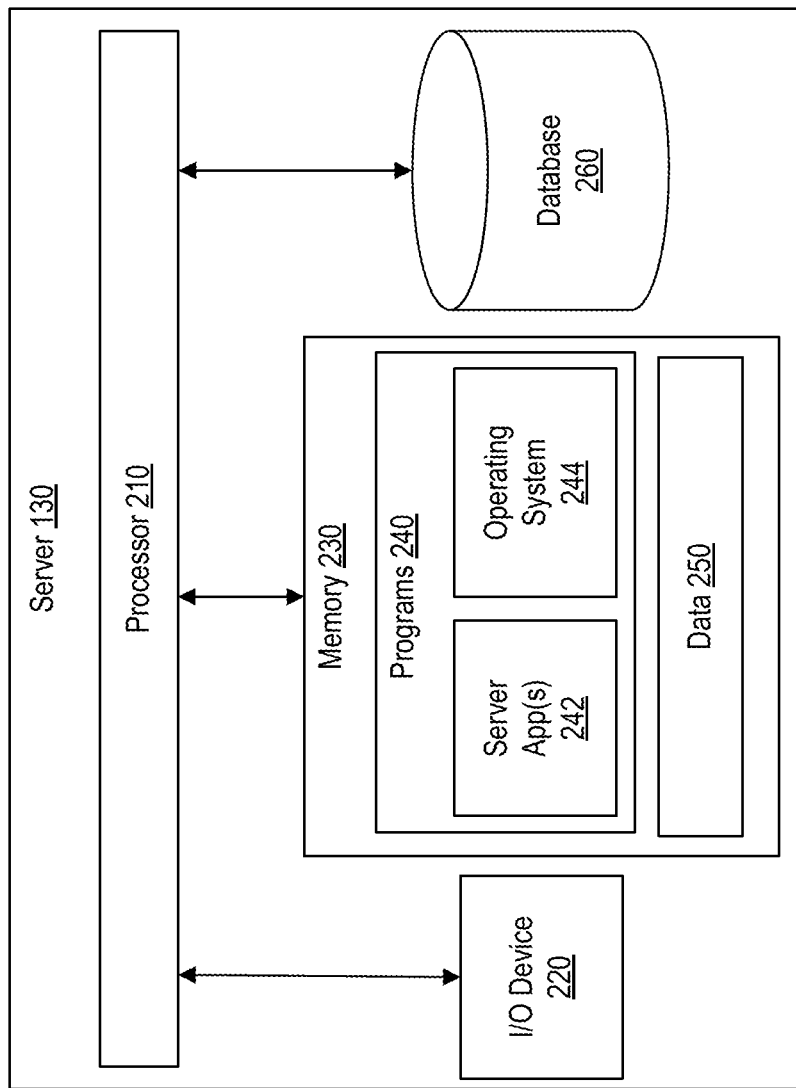
FIG. 2 is a block diagram of a server used in the system of FIG. 1, consistent with disclosed embodiments.

FIG. 2 is a block diagram of server 130, consistent with disclosed embodiments. As illustrated in FIG. 2, server 130 may include one or more of processors 210, input/output (I/O) devices 220, memories 230 for storing programs 240 including, for example, server app(s) 242, operating system 244s, and/or data 250, and a database 260. Server 130 may be a single server or may be configured as a distributed computer system including multiple servers or computers that interoperate to perform one or more of the processes and functions associated with the disclosed embodiments.

Processor 210 may include one or more known processing devices, such as a microprocessor from the Pentium™ family manufactured by Intel™ or the Turion™ family manufactured by AMD™, or any other type of microprocessor known in the art. Processor 210 may constitute a single core processor or may include one or more multiple core processors that execute parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow server 130 to execute multiple processes simultaneously. One of ordinary skill in the art would understand that other types of processor arrangements may be implemented to provide for the capabilities disclosed herein.

I/O devices 220 may include one or more devices configured to allow data to be received and/or transmitted by server 130. I/O devices 220 may include one or more user I/O devices and/or components, such as those associated with a keyboard, a mouse, a touchscreen, a display, etc. I/O devices 220 may also include one or more digital and/or analog communication devices that allow server 130 to communicate with other machines and devices, such as other components of system 10. I/O devices 220 may also include interface hardware configured to receive input information and/or display or otherwise provide output information. For example, I/O devices 220 may include a monitor configured to display a user interface.

Server 130 may include one or more storage devices configured to store information used by processor 210 (or other components) to perform certain functions related to the disclosed embodiments. In one example, server 130 may include memory 230 configured to store the information. Memory 230 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Memory 230 may include instructions to enable processor 210 to execute one or more applications, such as server applications, an electronic transaction application, network communication processes, and any other type of application or software known to be available on computer systems. Alternatively or additionally, the instructions, application programs, etc. may be stored in an internal database 260 or external storage (not shown in FIG. 2) that may be in direct communication with server 130. Such external storage may include one or more databases and/or memories accessible over network 190. Database 260 or other external storage may be a volatile or non-volatile, magnetic, semiconductor, tape, optical, removable, non-removable, or other type of storage device or tangible (i.e., non-transitory) computer-readable medium.

In the disclosed embodiments, server 130 may include memory 230 that may include instructions that, when executed by processor 210, perform one or more processes consistent with the functions disclosed herein. In some embodiments, server 130 may include memory 230 that may include one or more programs 240 for performing one or more functions of the disclosed embodiments. Moreover, processor 210 may execute one or more programs located remotely from system 10. For example, server 130 may access one or more remote programs, that, when executed, perform functions related to disclosed embodiments.

Programs 240 stored in memory 230 and executed by processor(s) 210 may include one or more server app(s) 242 and operating system 244. Server app(s) 242 may incorporate one or more applications (apps) that cause processor(s) 210 to execute one or more processes related to vehicle-to-vehicle communication, including but not limited to, receiving position signals of vehicles 110, 120 and tracking their positions and movements, receiving from a first vehicle (e.g., vehicle 110) a request for communication with another vehicle, determining a target vehicle (e.g., vehicle 120) of the request, transmitting the request to the target vehicle, monitoring the target vehicle's movements to determine whether it fulfills the request, etc.

Memory 230 and database 260 may include one or more memory devices that may store data and instructions used to perform one or more features of the disclosed embodiments. Memory 230 and database 260 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

Figure 3:
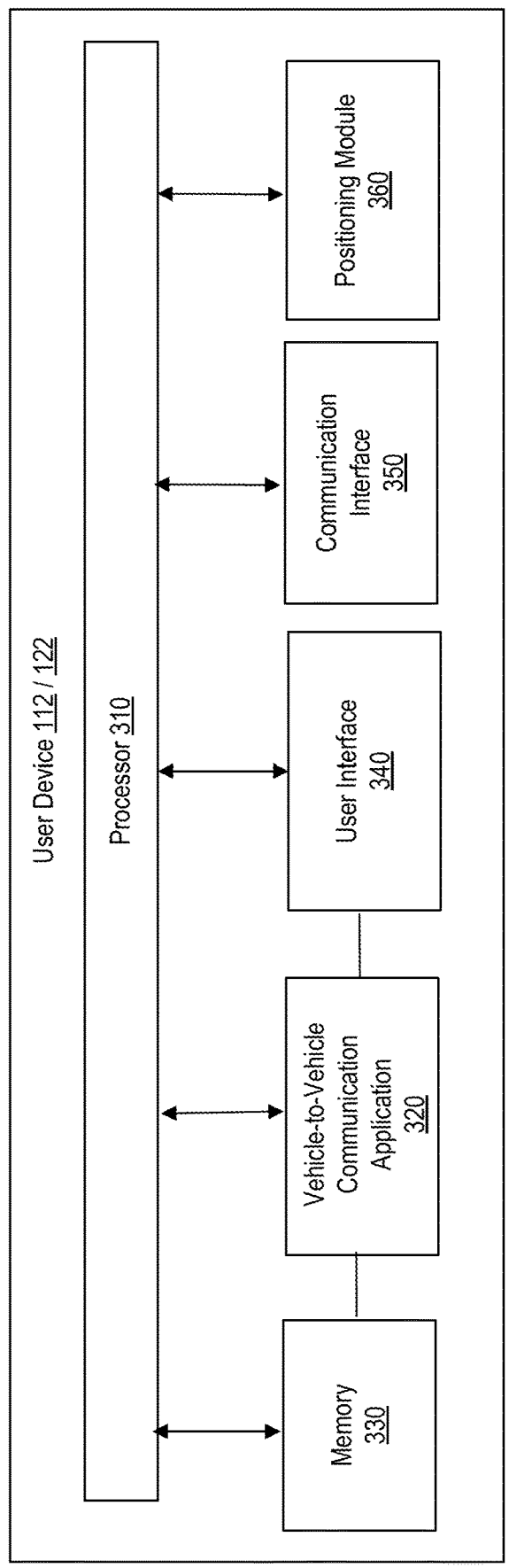
FIG. 3 is a block diagram of a user device used in the system of FIG. 1, consistent with disclosed embodiments.

FIG. 3 is a block diagram of user devices 112 and/or 122, consistent with disclosed embodiments. For example, user device 112 may be a mobile phone, a personal computer, a wearable device (e.g., a smart watch, smart glasses, etc.), a digital broadcast terminal, a messaging device, a tablet computer, a personal digital assistant, a vehicle-carried computer, and the like.

As shown in FIG. 3, user device 112 may include a processor 310, a vehicle-to-vehicle communication application 320, a memory 330, a user interface 340, a communication interface 350, and a positioning module 360. Consistent with the disclosed embodiments, user device 122 may be similarly configured as user device 112. Thus, the structure illustrated in FIG. 3 and its functions described below are equally applicable to user device 122.

Processor 310 may be similar to processor 210. In exemplary embodiments, processor 310 may include any appropriate type of general purpose or special-purpose microprocessor, digital signal processor, or microprocessor. Processor 310 may be configured as a separate processor module dedicated to performing the disclosed methods for vehicle-to-vehicle communication. Alternatively, processor 310 may be configured as a shared processor module for performing other functions of user device 110 unrelated to the disclosed methods for vehicle-to-vehicle communication. In the exemplary embodiments, processor 310 may execute computer instructions (program codes) stored in memory module 330, and may perform functions in accordance with exemplary techniques described in this disclosure.

Memory 330 may include any appropriate type of mass storage provided to store any type of information that processor 310 may need to operate. Memory 330 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 330 may be configured to store one or more computer programs that may be executed by processor 310 to perform the disclosed methods for vehicle-to-vehicle communication.

Vehicle-to-vehicle communication application 320 may be a module dedicated to performing some or all steps of the disclosed methods for vehicle-to-vehicle communication. Vehicle-to-vehicle communication application 320 may be configured as hardware, software, or a combination thereof. For example, vehicle-to-vehicle communication application 320 may be implemented as computer codes stored in memory 330 and executable by processor 310. As another example, vehicle-to-vehicle communication application 320 may be implemented as a special-purpose processor, such as an application-specific integrated circuit (ASIC), dedicated to performing the disclosed methods for vehicle-to-vehicle communication. As yet another example, vehicle-to-vehicle communication application 320 may be implemented as an embedded system or firmware.

User interface 340 may include a display panel. The display panel may include a liquid crystal display (LCD), a light-emitting diode (LED), a plasma display, a projection, or any other type of display, and may also include microphones, speakers, and/or audio input/outputs (e.g., headphone jacks).

User interface 340 may also be configured to receive input or commands from a user, e.g., a driver of vehicle 110. For example, the display panel may be implemented as a touch screen to receive input signals from the user. The touch screen may include one or more touch sensors to sense touches, swipes, and other gestures on the touch screen. The touch sensors may not only sense a boundary of a touch or swipe action, but also sense a period of time and a pressure associated with the touch or swipe action. Alternatively or additionally, user interface 340 may include other input devices such as keyboards, buttons, joysticks, tracker balls, and/or microphones for voice commands. User interface 340 may be configured to send the user input to processor 310 and/or vehicle-to-vehicle communication application 320.

Communication interface 350 may be configured to access a wireless network based on one or more communication standards, such as WiFi, LTE, 2G, 3G, 4G, 5G, etc. In some embodiments, communication interface 350 may be implemented based on a radio-frequency identification (RFID) technology, an infrared data association (IrDA) technology, an ultra-wideband (UWB) technology, a Bluetooth® technology, or other communication technologies.

Positioning module 360 may be configured as hardware, software, or a combination thereof to automatically determine position information of vehicle 110. For example, positioning module 360 may be a Global Positioning System (GPS) receiver configured to receive GPS signals from a satellite system 150 (FIG. 1) and may determine the position of vehicle 110 based on the GPS signals. As another example, positioning module 360 may be a General Packer Radio Service (GPRS) module configured to communicate with cellular base stations (not shown) near vehicle 110. The GPRS module may scan the surrounding cellular base stations and may be configured to determine the position of vehicle 110 based on the positions of the detected cellular base stations.

Figure 4:
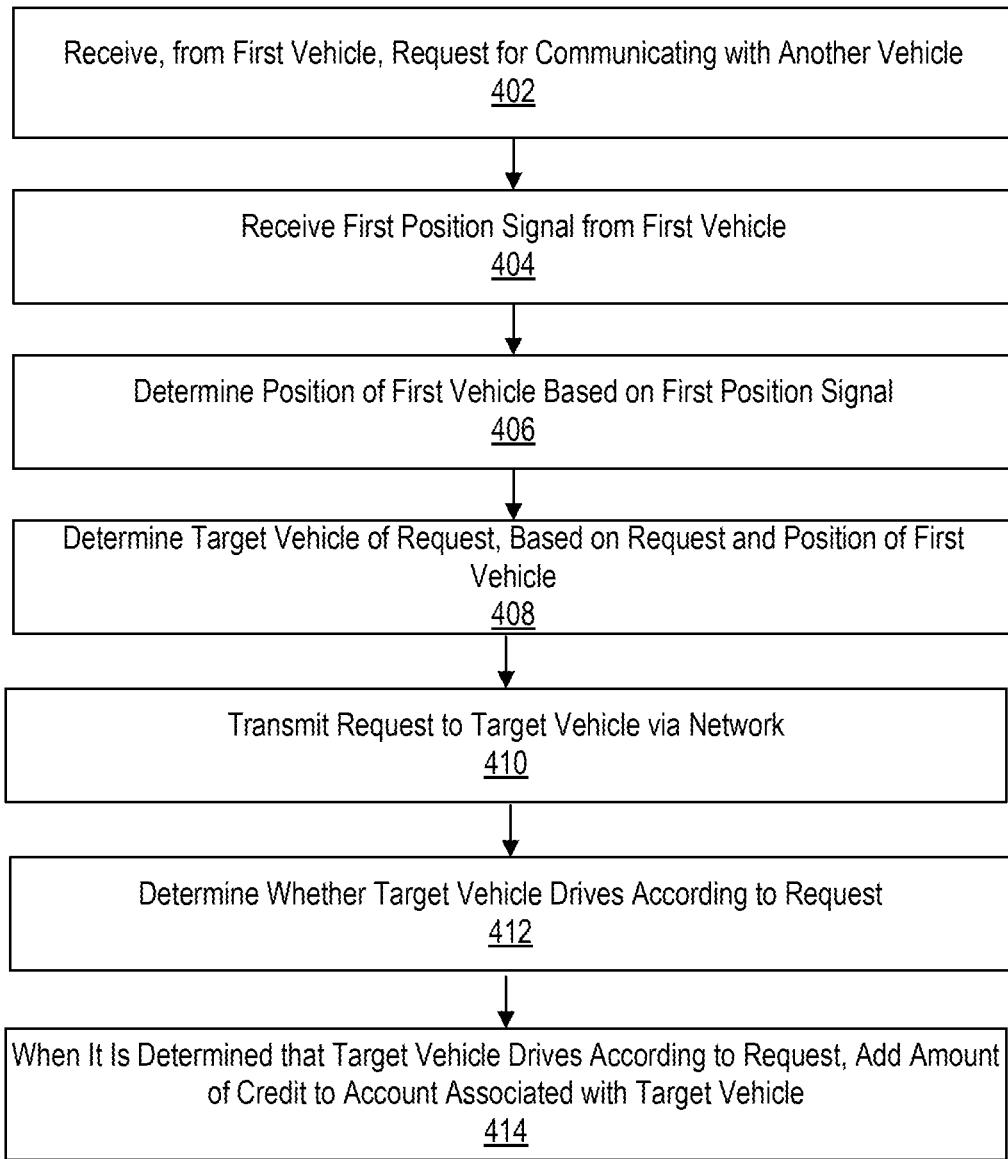
FIG. 4 is a flowchart of an exemplary method for vehicle-to-vehicle communication, consistent with disclosed embodiments.

FIG. 4 is a flowchart of an exemplary vehicle-to-vehicle communication method 400, consistent with disclosed embodiments. For example, method 400 may be performed by server 130. Referring to FIG. 4, method 400 may include the following steps.

In step 402, server 130 may receive, from a first vehicle, a request for communicating with another vehicle. For example, server 140 may receive the request from vehicle 110 (i.e., user device 112) via network 190. In one embodiment, vehicle 110 may be driving on a one-lane road and may request a second vehicle in front of vehicle 110 to change lanes or to temporarily stop at roadside, such that vehicle 110 can pass the second vehicle. In another embodiment, vehicle 110 may be driving on a city highway and may request a nearby vehicle to allow it to change multiple lanes to reach a nearest exit. In another embodiment, vehicle 110 may be merging into a lane and may request vehicles on the lane to allow it enter the lane. In another embodiment, vehicle 110 may be stopped at a red light and may request vehicle in nearby lanes to back up, such that vehicle 110 may change to the left lanes to make a left turn. In yet another embodiment, vehicle 110 may request nearby vehicles to yield to vehicle 110, such that vehicle 110 may have the right-of-way to complete certain tasks, e.g., entering/exiting a garage, changing lanes, making a turn, etc.

Consistent with the disclosed embodiments, the request made by vehicle 110 may specify that compensation is provided in exchange for other vehicles to fulfill the request. The compensation may be monetary or nonmonetary. For example, the compensation may be in the form of cash, reward points, tokens, scores, etc. The reward points, tokens, or scores may be exchangeable for certain merchandise or travel vouchers, or may be donated to a philanthropy project. Using the compensation, the driver of vehicle 110 can incentivize other drivers to perform certain driving behaviors, increasing the likelihood that the other drivers may fulfill the request.

In step 404, server 130 may receive a first position signal from the first vehicle. For example, positioning module 360 of user device 112 may receive a GPS signal and transmit the GPS signal to server 130 via network 190.

In step 406, server 130 may determine a position of the first vehicle (e.g., vehicle 110) based on the first position signal.

In step 408, server 130 may determine a target vehicle for the request, based on the request and based on the position of the first vehicle. For example, server 130 may also receive position signals from one or more nearby vehicles adjacent to the first vehicle. Server 130 may determine relative positions of the one or more nearby vehicles with respect to the first vehicle. Server 130 may also determine whether the relative positions match the request. Server 130 may then determine a nearby vehicle with the matching relative position as the target vehicle. For example, in the request for communicating with another vehicle, the driver of vehicle 110 may specify that it wants to ask the car in the front to let vehicle 110 pass the other vehicle. In this situation, therefore, server 130 may determine that the vehicle positioned immediately in front of vehicle 110 as the target vehicle.

In some embodiments, the request may also include a description about the target vehicle. The description may be, for example, at least one of a color, type (e.g., sedan, coupe, SUV, hatchback, pickup, truck), make, model, or license plate of the target vehicle. For example, the driver of vehicle 110 may specify that she wants the car on her right with a blue color to allow her to cut in front. If server 130 finds one of the vehicles on the right of vehicle 110 has a pre-stored profile indicating that it is blue colored, server 130 may determine that the blue vehicle is the target vehicle.

In step 410, server 130 may transmit the request to the target vehicle via network 190. For example, if the target vehicle is vehicle 120 (FIG. 1), server 130 may transmit the request to vehicle 120 via network 190.

In step 412, server 130 may determine whether the target vehicle drives according to the request. For example, server 130 may receive position signals from vehicle 120 and may track its positions and movements. If vehicle 120 moves in the manner specified by the request, sever 130 may determine that vehicle 120 has fulfilled the request. In some embodiments, server 130 may also take into account the movement of vehicle 110 and/or relative positions of vehicles 110, 120 to determine whether vehicle 120 drives according to the request.

For example, both vehicles 110 and 120 are driving in the same direction on a highway and on the same fast lane (e.g., the leftmost lane). Vehicle 110 is initially behind vehicle 120, but the driver of vehicle 110 feels vehicle 120 is too slow for the fast lane and blocks the traffic. Thus, vehicle 110 may request vehicle 120 to change to another lane (e.g., a lane on the right). The request may indicate that the driver of vehicle 110 is willing to pay the driver of vehicle 120, for example, $1, in exchange for the cooperation of vehicle 120. After the request is sent to vehicle 120, server 130 may monitor the relative positions of vehicles 110 and 120, and/or their moving paths. When server 130 determines that vehicle 120 has changed to another lane and vehicle 110 has passed vehicle 120, server 130 may determine that vehicle 120 has fulfilled the request.

In step 414, when it is determined that the target vehicle drives according to the request, server 130 may add an amount of credit to an account associated with the target vehicle (e.g., vehicle 120). The amount of credit may be specified in the request. For example, the driver of vehicle 110 may specify in the request that she is willing to pay 25 cents or even $1 in exchange for vehicle 120 changing to another lane or letting her pass.

In some embodiments, the disclosed system may also provide mechanisms to prevent a driver from abusing the system by deliberately blocking other drivers' use of the road. For example, if server 130 determines that vehicle 120 cuts in front of vehicle 110 before vehicle 110 sends the request, but drives under the average speed for that lane for longer than a predetermined time period, server 130 may determine that the driver of vehicle 120 is gaming the system and make her ineligible for receiving any compensation for a predetermined time window. In another example, server 130 may set a daily maximum for a driver's account to receive the compensation. In another example, if a driver repeatedly receives payments from other drivers for making the same maneuver (e.g., changing out of the left lane of a highway) to receive payments from other drivers, server 130 may reduce, within a predetermined time window, the amount of credit that the driver receives for making the maneuver. In another example, server 130 may count the number of vehicles going around or circumventing vehicle 120 (e.g., entering the lane in front of vehicle 120) within a predetermined time window, if the number is above a predetermined threshold, server 130 may determine that driver of vehicle 120 is intentionally holding up the traffic and makes her ineligible to receive compensation. In yet another example, server 130 may determine whether a driver has been reported for potential abuse of the compensation system. If the number of reports pertaining to a particular drive exceeds a threshold, sever 130 may temporarily ban the driver from receiving any compensation. If the driver is banned for more than a certain number of times, server 130 may permanently ban the driver from receiving the compensation.

As described above, in some embodiments, the first vehicle may request for communicating with multiple vehicles (step 402), or server 130 may determine multiple target vehicles (step 408). For example, in a heavy traffic the first vehicle may want to get in the lane on its left hand side. Server 130 may transmit a request to multiple vehicles in the left lane (step 410) and track the multiple vehicles' relative positions with respect to the first vehicle (step 412). If one or more vehicles of the multiple vehicles drive according to the request, i.e., allowing the first vehicle to move into the left lane, server 130 may credit the accounts associated with the one or more vehicles (step 414).

Moreover, in some embodiments, multiple vehicles may request for communicating with the same vehicle (step 402) or server 130 may determine the same target vehicle for multiple first vehicles (step 408). For example, on a one-lane road, multiple vehicles behind a slow-moving vehicle may want to incentivize the slow-moving vehicle to allow them to pass it. The drivers in the multiple vehicles may not necessarily know the identity of the slow-moving vehicle (for example, a driver who is several vehicles behind the slow-moving vehicle cannot see the slow-moving vehicle and thus cannot tell server 130 which is the slow-moving vehicle). However, server 130 may determine the slow-moving vehicle based on the vehicles' relative positions. For example, server 130 may determine the slow-moving vehicle to be a vehicle which is closely followed by multiple vehicles but forms a large distance (e.g., a distance larger than a predetermined threshold value) from other vehicles in front of it. Server 130 may then transmit a request to the slow-moving vehicle (step 410) and track the multiple vehicles' relative positions with respect to the slow-moving vehicle (step 412). If the slow-moving vehicle allows other vehicles to pass it, server 130 may credit the account associated with the slow-moving vehicle (step 414).

In this example, a maximum payout may be set for the slow-moving vehicle in order to prevent a driver from gaming the system by deliberately holding the traffic. For example, if two drivers behind the slow-moving vehicle offer $4 and $6 respectively to the slow-moving vehicle for allowing them to pass the slow-moving vehicle, while the maximum payout is set to be $5, server 130 may charge each of the two drivers a portion of the maximum payout that is proportional to the offer value, i.e., $2 and $3 respectively.

Figure 5:
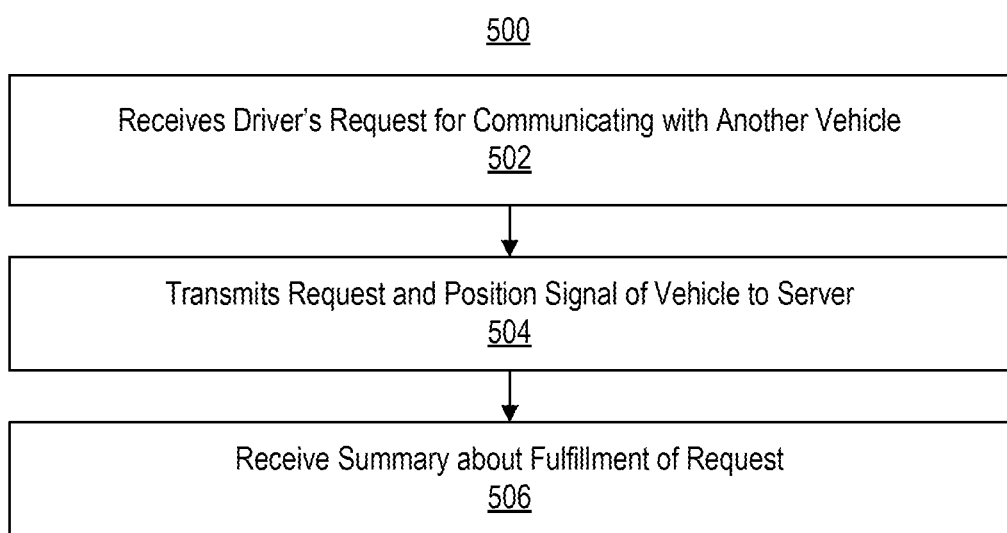
FIG. 5 is a flowchart of an exemplary method for vehicle-to-vehicle communication, consistent with disclosed embodiments.

FIG. 5 is a flowchart of an exemplary vehicle-to-vehicle communication method 500, consistent with disclosed embodiments. For example, method 500 may be performed by user device 112 (or user device 122). Referring to FIG. 5, method 500 may include the following steps.

In step 502, user device 112 may receive a driver's request for communicating with another vehicle. As described above, user device 112 may include a vehicle-to-vehicle communication application 320, which may be configured as hardware, software, or a combination thereof. For example, vehicle-to-vehicle communication application 320 may be an application installed on user device 112. In some embodiments, vehicle-to-vehicle communication application 320 may be voice activated. For example, vehicle-to-vehicle communication application 320 may employ a voice recognition algorithm to interpret a user's voice input. After vehicle-to-vehicle communication application 320 is activated, the driver of vehicle 110 may further provide the request she wishes to send to another vehicle. For example, the driver of vehicle 110 may indicate that she wants to request a vehicle in front of her (e.g., vehicle 120) to move to another lane or request a vehicle (e.g., vehicle 120) on a nearby left lane to allow vehicle 110 to cut into the left lane. The driver of vehicle 110 may also give a description of the vehicle to be contacted, e.g., "the green SUV on my left" or "the red car in the front with a license plate number ABC123." The driver of vehicle 110 may further specify the amount of compensation she can give to the other driver for fulfilling the request, e.g., "fifty cents," "one dollar," "five dollar," etc. Vehicle-to-vehicle communication application 320 may recognize the voice input and convert it into digital information.

In step 504, user device 112 may transmit the request and a position signal of vehicle 110 to server 130. Specifically, user device 112 may receive a GPS signal through position module 360. User device 112 may transmit the request and GPS signal to server 130 via network 190. Server 130 may then perform method 400 to communicate the target vehicle (s) of the request. For example, if vehicle 120 is the target vehicle of the request, server 230 may transmit the request to user device 122, which may generate a visual or audio prompt indicating the request. The driver of vehicle 120 may use user device 122 to indicate whether she accepts or declines the request via, e.g., voice input. In some embodiments, user device 122 may send to server 122 a feedback message indicating whether the driver of vehicle 120 has accepted or declined the request. Server 122 may also relay the feedback message to user device 112, such that the driver of vehicle 110 is informed about whether her request has been accepted or declined.

In step 506, user device 112 may receive, from server 130, a summary regarding fulfillment of the request. Specifically, when server 130 determines that the target vehicle (e.g., vehicle 120) drives according to the request, server 130 may send a message to user device 112, indicating that vehicle 120 has successfully completed the request and an amount of credit as specified in the request is being transferred from an account associated with vehicle 110 to an account associated with vehicle 120. In contrast, when server 130 determines that vehicle 120 fails to fulfill the request, server 130 may send a message to user device 112, indicating that the request is not completed. After receiving the messages from server 130, user device 112 may generate a visual or audio prompt indicating the fulfillment result of the request.

It is contemplated that some or all of the steps of method 400 may be performed by a user device (e.g., user device 112 or user device 122). For example, in some embodiments, user device 112 may send the request for communication to user device 122 directly, instead of via server 130. The present disclosure does not limit the actual hardware component for performing the disclosed methods.

In some embodiments, vehicle-to-vehicle communication application 320 may provide an automatic communication mode in which system 10 may automatically contact a target vehicle for performing certain tasks, without waiting for a user's input. For example, if the driver of vehicle 110 is in a hurry, e.g., transferring his spouse in labor to a hospital, the driver may prefer to stay in the fast lane of a highway without being blocked by slow traffic. The driver may set vehicle-to-vehicle communication application 320 in an automatic communication mode, such that system 10 may automatically detect slower vehicles travelling in front of vehicle 110 on the same fast lane, and automatically request these slower vehicles to move to other lanes in exchange for a preset amount of compensation. In one embodiment, server 130 may track the movement of vehicle 110 based on received position signal from vehicle 110. When server 130 determines that vehicle 110 approaching from behind a second vehicle on the same lane and that the second vehicle is driving slower than vehicle 110, server 130 may automatically transmit a request to the second vehicle, requesting the second vehicle to move to another lane in exchange for certain compensation. This way, system 10 may preemptively identify and contact vehicles that may affect vehicle 110's use of the road.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or described during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A computer-implemented method for vehicle communication, the computer-implemented method comprising:
   receiving, at a server from a first vehicle, a maneuvering request for a target vehicle, wherein the maneuvering request comprises a requested maneuver;
   receiving, at the server from the first vehicle, a position signal comprising a position of the first vehicle;
   in response to the maneuvering request, determining, at the server, the target vehicle based on the position of the first vehicle and the requested maneuver;
   transmitting the maneuvering request to the target vehicle via a network;
   determining whether the target vehicle operates according to the maneuvering request; and
   adding an amount of credit to an account associated with the target vehicle when it is determined that the target vehicle operates according to the maneuvering request.

2. The computer-implemented method of claim 1, wherein the maneuvering request further comprises a request for the target vehicle to:
   change a lane in exchange for the credit;
   yield to a different vehicle in exchange for the credit; or
   back up in exchange for the credit.

3. The computer-implemented method of claim 1, wherein the maneuvering request includes a description of the target vehicle, and the description comprises at least one of a color, a type, a make, a model, or license plate information of the target vehicle.

4. The computer-implemented method of claim 1, wherein the maneuvering request comprises a position of the target vehicle.

5. The computer-implemented method of claim 1, further comprising receiving the maneuvering request via the network from a computer embedded in a different vehicle or a mobile device located in the different vehicle.

6. The computer-implemented method of claim 1, further comprising identifying the target vehicle by:
  receiving, over the network, a first position signal from a different vehicle;
  receiving, over the network, a second position signal from the target vehicle;
  determining a relative position of the target vehicle with respect to the different vehicle, based on the first position signal and the second position signal;
  determining whether the relative position matches a position within the maneuvering request; and
  identifying the target vehicle when the relative position matches the position in the maneuvering request.

7. The computer-implemented method of claim 1, further comprising:
  determining movement of a different vehicle; and
  automatically transmitting the maneuvering request to the target vehicle when the movement indicates that the different vehicle is approaching the target vehicle.

8. A non-transitory computer-readable medium storing instructions, which when executed by one or more processors causes the one or more processors to perform operations comprising:
  receiving, at a server from a first vehicle, a maneuvering request for a target vehicle, wherein the maneuvering request comprises a requested maneuver;
  in response to the maneuvering request, determining, at the server, the target vehicle based on a position of the first vehicle and the requested maneuver;
  transmitting the maneuvering request to the target vehicle via a network;
  determining whether the target vehicle operates according to the maneuvering request; and
  adding an amount of credit to an account associated with the target vehicle when it is determined that the target vehicle operates according to the maneuvering request.

9. The non-transitory computer-readable medium of claim 8, wherein the maneuvering request further comprises a request for the target vehicle to:
  change a lane in exchange for the credit;
  yield to a different vehicle in exchange for the credit; or
  back up in exchange for the credit.

10. The non-transitory computer-readable medium of claim 8, wherein the maneuvering request comprises a description of the target vehicle and wherein the description comprises at least one of a color, a type, a make, a model, or license plate information of the target vehicle.

11. The non-transitory computer-readable medium of claim 8, wherein the maneuvering request comprises a position of the target vehicle.

12. The non-transitory computer-readable medium of claim 8, further comprising receiving the maneuvering request over the network from a computer embedded in a different vehicle or a mobile device located in the different vehicle.

13. The non-transitory computer-readable medium of claim 8, further comprising:
  receiving, over the network, a first position signal from a different vehicle;
  receiving, over the network, a second position signal from the target vehicle;
  determining a relative position of the target vehicle with respect to the different vehicle, based on the first position signal and the second position signal;
  determining whether the relative position matches a position within the maneuvering request; and
  identifying the target vehicle when the relative position matches the position within the maneuvering request.

14. The non-transitory computer-readable medium of claim 8, further comprising:
  determining movement of a different vehicle; and
  automatically transmitting the maneuvering request to the target vehicle when the movement indicates that the different vehicle is approaching the target vehicle.

15. A system for vehicle communication, the system comprising:
  one or more processors; and
  a non-transitory computer-readable storage medium storing instructions, which, when executed by the one or more processors, cause the one or more processors to perform operations comprising:
    receiving, from a first vehicle, a maneuvering request for a target vehicle, wherein the maneuvering request comprises a requested maneuver;
    in response to the maneuvering request, determining the target vehicle based on a position of the first vehicle and the requested maneuver;
    transmitting the maneuvering request to the target vehicle via a network;
    determining whether the target vehicle operates according to the maneuvering request; and
    adding an amount of credit to an account associated with the target vehicle when it is determined that the target vehicle operates according to the maneuvering request.

16. The system of claim 15, wherein the maneuvering request further comprises a request for the target vehicle to:
  change a lane in exchange for the credit;
  yield to a different vehicle in exchange for the credit; or
  back up in exchange for the credit.

17. The system of claim 15, further comprising receiving a description of the target vehicle, wherein the description comprises at least one of a color, a type, a make, a model, or license plate information of the target vehicle.

18. The system of claim 15, wherein the maneuvering request comprises a position of the target vehicle.

* * * * *